(12) United States Patent
Kim et al.

(10) Patent No.: US 10,566,656 B2
(45) Date of Patent: Feb. 18, 2020

(54) ALL SOLID STATE BATTERY AND MANUFACTURING METHOD THEREOF

(71) Applicant: Hyundai Motor Company, Seoul (KR)

(72) Inventors: Dong Hul Kim, Gyeonggi-do (KR); Sang Jin Park, Gyeonggi-do (KR); Sung Hoon Lim, Gyeonggi-do (KR); Shin Kook Kong, Seoul (KR); Sang Heon Lee, Gyeonggi-do (KR); Sang Mok Park, Gyeonggi-do (KR); Hong Seok Min, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/834,534

(22) Filed: Dec. 7, 2017

(65) Prior Publication Data

US 2019/0081351 A1   Mar. 14, 2019

(30) Foreign Application Priority Data

Sep. 11, 2017   (KR) .................. 10-2017-0115640

(51) Int. Cl.
*H01M 10/0562* (2010.01)
*H01M 4/38* (2006.01)
(Continued)

(52) U.S. Cl.
CPC ....... *H01M 10/0562* (2013.01); *H01M 4/382* (2013.01); *H01M 4/525* (2013.01); *H01M 4/623* (2013.01); *H01M 4/625* (2013.01); *H01M 10/052* (2013.01); *H01M 10/058* (2013.01); *H01M 10/0525* (2013.01); *H01M 2004/021* (2013.01); *H01M 2300/0068* (2013.01)

(58) Field of Classification Search
CPC .................................... H01M 10/0562
See application file for complete search history.

(56) References Cited

U.S. PATENT DOCUMENTS

| | | | |
|---|---|---|---|
| 2005/0064289 A1* | 3/2005 | Suzuki | H01M 4/0404 429/209 |
| 2009/0081553 A1* | 3/2009 | Kondo | H01M 2/021 429/314 |

(Continued)

FOREIGN PATENT DOCUMENTS

| | | | |
|---|---|---|---|
| JP | 2000164205 A | * 6/2000 | ............ H01M 10/05 |
| JP | 2012-209104 | 10/2012 | |

(Continued)

OTHER PUBLICATIONS

JP200164205 translation (Year: 2019).*

*Primary Examiner* — Brian R Ohara
(74) *Attorney, Agent, or Firm* — Mintz Levin Cohn Ferris Glovsky and Popeo, P.C.; Peter F. Corless

(57) ABSTRACT

An all-solid-state battery includes: a cathode substrate; a cathode portion; a solid electrolyte layer; an anode portion; and an anode substrate. The cathode portion includes a cathode active material, a first solid electrolyte, a conductive material, and a binder, the anode portion is configured by a first anode portion having a pore structure and a second anode portion having metal foil, and the first anode portion includes a second solid electrolyte, a conductive material, and a binder.

7 Claims, 2 Drawing Sheets

(51) Int. Cl.
*H01M 4/525* (2010.01)
*H01M 4/62* (2006.01)
*H01M 10/0525* (2010.01)
*H01M 10/058* (2010.01)
*H01M 10/052* (2010.01)
*H01M 4/02* (2006.01)

(56) References Cited

U.S. PATENT DOCUMENTS

2012/0021285 A1\* 1/2012 Kogetsu .............. H01M 4/0402
429/218.1
2014/0159675 A1\* 6/2014 Kodama ............... H01M 4/505
320/137

FOREIGN PATENT DOCUMENTS

| KR | 10-2014-0021072 | 2/2014 |
| KR | 10-2015-0143365 | 12/2015 |
| KR | 10-2016-0042859 | 4/2016 |

\* cited by examiner

[FIG. 1]
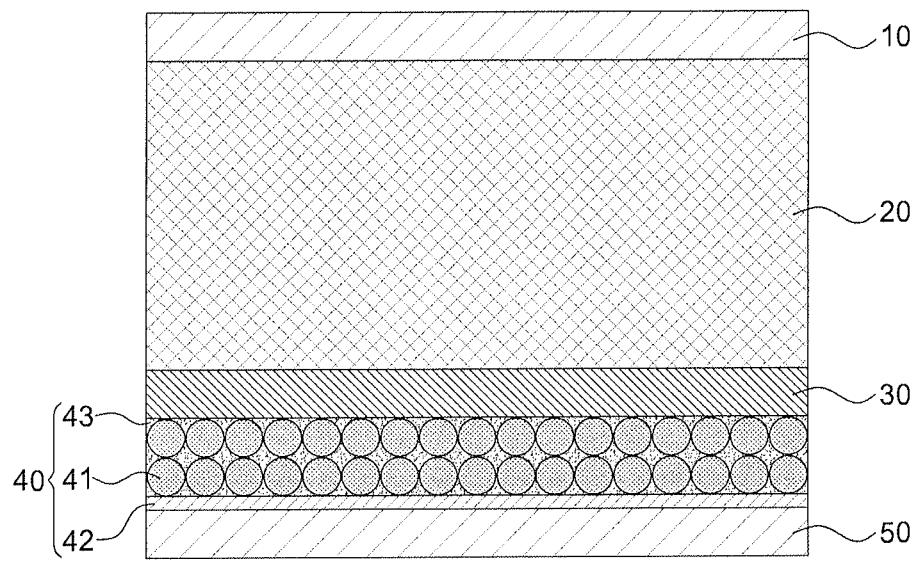

[FIG. 2]
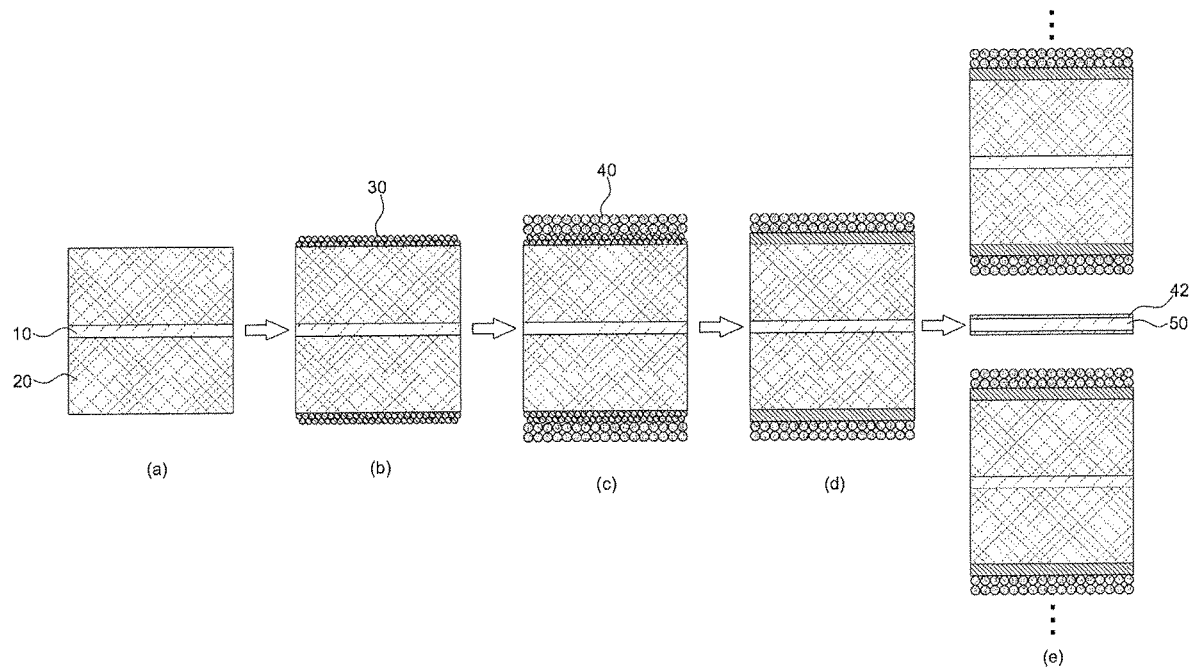
[FIG. 3]
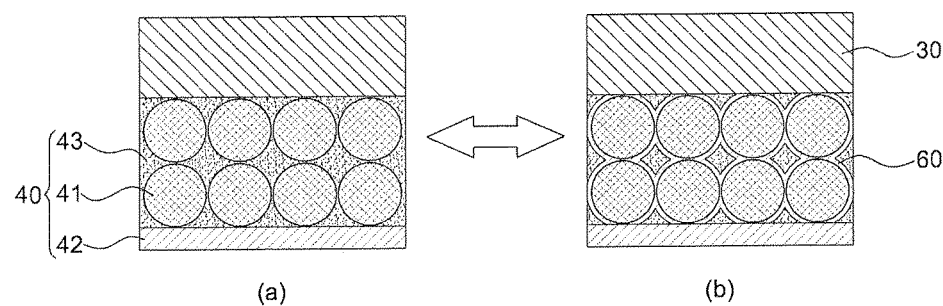

ALL SOLID STATE BATTERY AND MANUFACTURING METHOD THEREOF

CROSS-REFERENCE TO RELATED APPLICATION

This application claims under 35 U.S.C. § 119(a) the benefit of priority to Korean Patent Application No. 10-2017-0115640 filed Sep. 11, 2017, the entire contents of which are incorporated by reference as if fully set forth herein.

BACKGROUND

(a) Technical Field

The present disclosure relates to an all-solid-state battery and a manufacturing method thereof. More particularly, it relates to an all-solid-state battery and a manufacturing method thereof with improved energy density and electrode lifespan.

(b) Background Art

Recent demand for lithium-ion secondary batteries for use in a wide range of devices such as portable information terminals, portable electronic devices, electric vehicles, hybrid electric vehicles, stationary storage systems, and the like has increased. However, conventional lithium-ion secondary batteries use a combustible organic solvent as an electrolytic solution requiring a durable exterior so as to prevent the organic solvent from being leaked. In the case of a portable personal computer, there is a restriction on the structure of the apparatus because it is necessary to prepare the structure for the risk of electrolyte leakage.

As such, safety surrounding lithium-ion batteries is a major concern, and efforts have been made to develop an all-solid-state lithium-ion secondary battery that does not use harmful substances such as an organic solvent. In the case of a conventional liquid electrolyte system, direct use has been limited due to the formation of continuous solid electrolyte interphase (SEI) coating of a liquid electrolyte and lithium metal during charging and discharging.

On the contrary, in the case of an all-solid-state battery system, since the electrolyte is solid, rather than liquid, the energy density of the battery may be increased by using lithium metal. In such case, there is an advantage in that a large capacity of 3650 mAh/g can be expressed and a high-density battery can be manufactured.

In conventional systems, an all-solid-state battery system includes a cathode substrate, a cathode active material layer, a solid electrolyte layer, an anode active material layer, and an anode substrate. Particularly, an anode portion is formed only of the anode active material like the conventional liquid electrolyte system, or formed of a mixture of a graphite-based anode active material and a solid electrolyte, or directly uses metal such as lithium or indium.

However, when lithium metal is directly used as a counter electrode in the all-solid-state cell, there is no site where lithium is to be reduced while lithium ions in the cathode are reduced at the anode counter electrode in a first charging process, and as a result, the lithium anode portion is expanded and thus, the electrode is broken or lithium is grown to the solid electrolyte layer. Consequently, short circuits may occur.

The above information disclosed in this Background section is only for enhancement of understanding of the background of the disclosure, and therefore it may contain information that does not form the related art.

SUMMARY OF THE DISCLOSURE

The present disclosure has been made in an effort to solve the above-described problems associated with related art.

In order to solve the above problems, embodiments of the present disclosure can improve energy density and electrode lifespan by applying an anode portion configured by a first anode portion having a pore structure and a second anode portion having metal foil to prevent volume expansion and electrode breakage of the anode portion due to oxidation and reduction reactions of lithium during charging and discharging.

An object of the present disclosure is to provide an all-solid-state battery with improved energy density and electrode lifespan. Another object of the present disclosure is to provide a manufacturing method of an all-solid-state battery.

According to embodiments of the present disclosure, an all-solid-state battery includes: a cathode substrate; a cathode portion; a solid electrolyte layer; an anode portion; and an anode substrate. The cathode portion includes a cathode active material, a first solid electrolyte, a conductive material, and a binder, the anode portion is configured by a first anode portion having a pore structure and a second anode portion having metal foil, and the first anode portion includes a second solid electrolyte, a conductive material, and a binder.

The first solid electrolyte of the cathode portion may be an amorphous sulfide-based solid electrolyte.

The second solid electrolyte of the anode portion may be a crystalline sulfide-based solid electrolyte.

The first anode portion may include 80 to 95 wt % of the second solid electrolyte, 5 to 20 wt % of the conductive material, and 2 to 10 wt % of the binder.

A porosity of the first anode portion may be between 2 and 15%.

The metal foil of the second anode portion may be composed of lithium.

A thickness of the second anode portion may be between 2 and 50 µm.

Furthermore, according to embodiments of the present disclosure, a manufacturing method of an all-solid-state battery includes: forming a cathode portion by applying a cathode slurry containing a cathode active material, a first solid electrolyte, a conductive material, and a binder to a cathode substrate; drying the cathode slurry applied to the cathode substrate; forming a solid electrolyte layer by applying a solid electrolyte to the cathode portion; drying the solid electrolyte applied to the cathode portion; forming a first anode portion by applying an anode slurry including a second solid electrolyte, a conductive material, and a binder to the solid electrolyte layer; drying the anode slurry applied to the solid electrolyte layer; forming a second anode portion having metal foil on the first anode portion; forming an anode substrate on the second anode portion; and compressing the anode substrate.

Other aspects and preferred embodiments of the disclosure are discussed infra.

BRIEF DESCRIPTION OF THE DRAWINGS

The above and other features of the present disclosure will now be described in detail with reference to certain embodiments thereof illustrated in the accompanying drawings which are given hereinbelow by way of illustration only, and thus are not limitative of the present disclosure, and wherein:

FIG. 1 is a cross-sectional view of an all-solid-state battery according to embodiments of the present disclosure;

FIG. 2 is a schematic view illustrating a continuous manufacturing process of an all-solid-state battery according to embodiments of the present disclosure; and FIG. 3 is a schematic view illustrating a lithium production process after charging and discharging of the all-solid-state battery according to embodiments of the present disclosure.

Reference numerals set forth in the Drawings includes reference to the following elements as further discussed below:

| 10: cathode substrate | 20: cathode portion |
|---|---|
| 30: solid electrolyte layer | 40: anode portion |
| 41: first anode portion | 42: second anode portion |
| 43: pore | 50: anode substrate |
| 60: lithium metal | |

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with certain embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, the present disclosure will be described in more detail by way of disclosed embodiments.

The present disclosure provides an all-solid-state battery including a cathode substrate, a cathode portion 20, a solid electrolyte layer 30, an anode portion 40, and an anode substrate, in which the cathode portion 20 includes a cathode active material, a first solid electrolyte, a conductive material and a binder, the anode portion 40 is configured by a first anode portion 41 having a structure of the pores 43 and a second anode portion 42 having metal foil, and the first anode portion 41 includes a second solid electrolyte, a conductive material and a binder.

In the all-solid-state battery according to embodiments of the present disclosure, the anode portion 40 in which volume expansion occurs due to reduction and oxidation reactions of lithium to cause breakage of the electrode and loss of a conductive path is disposed by two layers configured by the first anode portion 41 having pores 43 capable of ion conduction and electron conduction and the second anode portion 42 having at least metal foil to provide a lithium reduction reaction site in the charging process and prevent expansion of the anode portion 40 and the breakage of the electrode.

The first anode portion 41 having the pores 43 serves as a reservoir for storing Li in the reduction and oxidation reactions of lithium so as to suppress a change in volume of the electrode and uses an anode member to a minimum to improve lifespan performance of the all-solid-state battery and improve the energy density.

According to embodiments of the present disclosure, the anode portion 40 may be configured by the first anode portion 41 having a structure of the pores 43 and the second anode portion 42 having the metal foil. The first anode portion 41 is formed by a hard solid electrolyte, a conductive material, and a binder and manufactured so that the pores 43 are not completely filled during compression and the pores are naturally generated.

When the first anode portion 41 having the structure of the pores 43 is formed, lithium-ion conduction and electron conduction are possible. The pores formed in the first anode portion 41 serve as reaction sites of lithium metal which is reduced on the surfaces of the solid electrolyte and the conductive material during charging to suppress the volume expansion of the anode portion 40. Also, like the conventional all-solid-state battery, as compared with a case of simply using lithium metal, a reaction area of the lithium metal is increased after the first charging to improve an output characteristic.

The second solid electrolyte, which is a component of the first anode portion 41, is made of a hard material and may use a sulfide-based solid electrolyte, specifically, a crystalline sulfide-based solid electrolyte, for example, at least one selected from the group consisting of crystalline Li—P—S, crystalline system Li—P—S—Cl, and crystalline Li—P—S—I. In particular, since the first anode portion 41 uses the hard second solid electrolyte of which particles keep the shape and are not broken during compression, the first anode portion 41 having the structure of the pores 43 may be formed.

According to embodiments of the present disclosure, the first anode portion 41 may include 80 to 95 wt % of the second solid electrolyte, 5 to 20 wt % of the conductive material, and 2 to 10 wt % of the binder. At this time, when the content of the second solid electrolyte is less than 80 wt %, a sufficient lithium-ion conduction effect may not be secured, and when the content thereof is more than 95 wt %, the electronic conductivity and adhesion may be insufficient.

According to embodiments of the present disclosure, the porosity of the first anode portion 41 may be 2 to 15%. In this case, when the porosity of the first anode portion 41 is less than 2%, a space to generate lithium moving from the cathode during charging may be insufficient, and when the porosity is more than 15%, output performance according to the insufficiency of lithium-ion conduction may be insufficient.

According to embodiments of the present disclosure, the second anode portion 42 may use metal foil. The second anode portion 42 may serve to first deposit lithium-ions transferred from the cathode and to maintain the loss of lithium due to the irreversible reaction in the anode and each interface. It is also possible to operate the second anode portion even if the amount of lithium metal is absolutely small compared with the capacity of the cathode.

According to embodiments of the present disclosure, in the second anode portion 42, the metal foil is lithium, but is not limited thereto. Furthermore, according to embodiments of the present disclosure, the thickness of the second anode portion 42 may be 2 to 50 μm. When the thickness of the second anode portion 41 is less than 2 μm, lithium which is consumed irreversibly in the early stages may not be sufficiently maintained, and when the thickness is more than 50 μm, a loss of energy density is caused in an amount larger than that of lithium received from the cathode.

According to embodiments of the present disclosure, the first solid electrolyte of the cathode portion 20 is made of a soft material, and particularly, may be an amorphous sulfide-based solid electrolyte, for example, at least one selected from the group consisting of amorphous Li—P—S and amorphous Li—Ni—P—S, but is not limited thereto. Also, the solid electrolyte layer 30 serving as a separator has a pore-free structure in the compression process by using the solid electrolyte made of soft material. As a result, the lithium metal reduced in the first anode portion 41 is grown to the solid electrolyte layer 30 to prevent the problem causing short-circuit with the cathode portion 20. The solid electrolyte layer 30 may use at least one selected from the group consisting of amorphous Li—P—S and amorphous Li—Ni—P—S as a soft material, but is not limited thereto.

Meanwhile, a manufacturing method of the all-solid-state battery of the present disclosure includes: (a) forming a cathode portion 20 by applying and drying cathode slurry containing a cathode active material, a first solid electrolyte, a conductive material and a binder on the cathode substrate 10; (b) forming a solid electrolyte layer 30 by applying and drying a solid electrolyte on the cathode portion 20; (c) forming a first anode portion 41 by applying and drying anode slurry including a second solid electrolyte, a conductive material and a binder on the solid electrolyte layer 30; (d) forming a second anode portion 42 having metal foil on the first anode portion 41; and (e) forming and then compressing an anode substrate 50 on the second anode portion 42.

According to embodiments of the present disclosure, the method may further include compressing the anode portion by a cold isostatic press (CIP) or roll press between step (c) and step (d).

FIG. 1 is a cross-sectional view of an all-solid-state battery according to embodiments of the present disclosure. As shown in FIG. 1, the all-solid-state battery has a structure in which the anode substrate 50, the cathode portion 20 and the solid electrolyte layer 30 are formed in sequence, the anode portion 40 configured by the first anode portion 41 having the structure of the pores and the second anode portion 42 made of metal foil is formed on the solid electrolyte layer 30, and the anode substrate 50 is formed on the anode portion 40.

FIG. 2 is a schematic view illustrating a continuous manufacturing process of an all-solid-state battery according to embodiments of the present disclosure. In portion (a) of FIG. 2, the cathode slurry containing the cathode active material, the solid electrolyte, the conductive material, and the binder is applied and then dried on both surfaces of the cathode substrate 10 to form the cathode portion 20. In portion (b) of FIG. 2, a solid electrolyte slurry including a soft-solid electrolyte and a binder is applied and then dried on the upper portion of the cathode portion 20 to form the solid electrolyte layer 30. In the process (b), the solid electrolyte layer 30 may be formed while the pores are still present.

In portion (c) of FIG. 2, the anode slurry including the hard solid electrolyte, the conductive material, and the binder is applied and dried on the solid electrolyte layer 30 to form the first anode portion 41. Next, in portion (d) of FIG. 2, the electrode formed with the first anode portion 41 may be compressed through a cold isostatic press (CIP) or a roll press. At this time, when each electrode portion and the electrolyte layer are compressed, the thickness is reduced and the solid electrolyte layer 30 is changed into a structure without pores.

FIG. 3 is a schematic view illustrating a lithium production process after charging and discharging of the all-solid-state battery according to embodiments of the present disclosure. Portion (a) of FIG. 3 illustrates an initial discharge state, and portion (b) of FIG. 3 illustrates a lithium generation process in the initial charge state. In the discharge state shown in portion (a) of FIG. 3, it can be seen that the pores 43 are present in the first anode portion 41, but in the charge state shown in portion (b) of FIG. 3, while lithium of the cathode moves to the anode to be reduced at the second anode portion 42, the lithium metal 60 is formed in the structure of the pores 43 between the hard solid electrolytes of the first anode portion 41. The lithium metal 60 generated during the charging/discharging process is changed into ions and moves to the cathode again, and at this time, the lithium metal 60 formed in the second anode portion 42 may serve to first compensate for lithium which is irreversibly lost at the cathode and the interface.

Therefore, in the all-solid-state battery according to embodiments of the present disclosure, the anode portion 40 configured by the first anode portion 41 having the structure of the pores 43 and the second anode portion 42 having metal foil is applied to prevent a change in volume and electrode breakage of the anode portion 40 due to oxidation and reduction reactions of lithium during charging and discharging, thereby improving energy density and electrode lifespan.

The conventional lithium metal having relatively higher energy density than the anode portion 40 including the anode active material is used as the anode portion 40, thereby improving the energy density.

The first anode portion 41 using the hard-solid electrolyte and the solid electrolyte layer 30 using the soft solid electrolyte may form both a pore structure and a pore-free structure through the compression process in the depositing process after coating the slurry, and thus, it is advantageous in terms of excellent workability.

Hereinafter, the present disclosure will be described in more detail based on Examples. The Examples are provided merely for demonstration purposes, and the present disclosure is not limited by the following Examples.

EXAMPLES

Examples 1 and 2

(1) Preparation of Cathode Slurry

To prepare a cathode complex, $LiCoO_2$ cathode active material powder, a solid electrolyte (amorphous Li—P—S), carbon conductive powder (super P), and a binder (fluorine-based, dien-based) for binding in the electrode were sufficiently mixed at a composition ratio of 70:30:5:5.

Herein, the conductive material may use a powder type of Super-P or Denka or a rod-type of VGCF, and the binder may include a polymer compound of a fluorine-based, diene-based, acrylic-based or silicone-based polymer.

The complexes were added into an organic solvent and mixed for a predetermined time to obtain uniformly dispersed slurry. The solids are adjusted with the proper viscosity for coating and the viscosity of about 800 to 3000 cPs is suitable.

The organic solvent can use cyclic aliphatic hydrocarbons such as cyclopentane and cyclohexane, and aromatic hydrocarbons such as toluene and xylene, and these solvents may be used singly or in combination of two or more to be properly selected in terms of a drying speed or an environment. However, in the present disclosure, when a sulfide-based electrolyte is used, it is preferred to use an aromatic hydrocarbon-based non-polar solvent in terms of chemical reactivity.

(2) Preparation of Slurry of Solid Electrolyte Layer

A solid electrolyte (amorphous Li—P—S) and a binder were mixed at a ratio of 95:5. A mixing process condition is fabricated by a similar process condition to the electrode slurry mixing.

(3) Preparation of First Anode Slurry

Like the preparation of the slurry of the solid electrolyte layer, solid electrolyte powder (crystalline Li—P—S), carbon conductive powder, and a binder for binding in the electrode were sufficiently mixed at a composition ratio of 85:10:5. A mixing process condition is fabricated by a similar process condition to the cathode slurry mixing.

(4) Manufacturing Method

The manufacturing method includes forming a cathode portion 20 by applying and drying cathode slurry on the cathode substrate 10; forming a solid electrolyte layer 30 by applying and drying slurry of a solid electrolyte layer on the cathode portion 20; forming first anode slurry on the solid electrolyte layer 30 (a first anode portion was formed to have an anode loading of 10 mg/cm² and in Examples 1 and 2, the first anode portion was formed to have porosity illustrated in Table 1 below; forming a second anode portion 42 having metal foil on the first anode portion 41; and forming and then compressing an anode substrate 50 on the second anode portion 42.

A CIP process was performed after coating the first anode portion.

Comparative Examples 1 to 3

Except for varying the porosity of the first anode portion and a composition of the first anode portion as illustrated in Table 1 below, an all-solid-state battery was manufactured in the same manner as Examples 1 and 2.

TEST EXAMPLES

Cathode discharge capacities and charge/discharge efficiency of the all-solid-state batteries in Examples 1 and 2 and Comparative Examples 1 to 3 were measured. The result is illustrated in Table 1 below.

TABLE 1

| | Loading of cathode portion (mg/cm²) | Loading of solid electrolyte layer portion | Composition of first anode portion (electrolyte:carbon:binder) | Porosity of first anode portion | Thickness of second anode portion | Cathode discharge capacity | Charge/discharge efficiency |
|---|---|---|---|---|---|---|---|
| Example 1 | 20 | 5 | 85:10:5 | 10% | 30 μm | 151 | 85% |
| Example 2 | | | 85:10:5 | 5% | 30 μm | 150 | 87% |
| Comparative Example 1 | | | 85:10:5 | 1% | 30 μm | 87 | 71% |
| Comparative Example 2 | | | 85:10:5 | 20% | 30 μm | 131 | 58% |
| Comparative Example 3 | | | 96:2:2 | 10% | 30 μm | 111 | 73% |

As shown in Table 1, it can be seen that Examples 1 and 2 have a high cathode discharge capacity of 150 mAh/g or more and excellent charge/discharge efficiency of 85% or more.

The disclosure has been described in detail with reference to certain embodiments thereof. However, it will be appreciated by those skilled in the art that changes may be made in these embodiments without departing from the principles and spirit of the disclosure, the scope of which is defined in the appended claims and their equivalents.

What is claimed is:

1. An all-solid-state battery, comprising:
   a cathode substrate;
   a cathode portion;
   a solid electrolyte layer including an amorphous sulfide-based solid electrolyte;
   an anode portion; and
   an anode substrate, wherein
   the cathode portion includes a cathode active material, a first solid electrolyte, a conductive material, and a binder,
   the anode portion is configured by a first anode portion having a pore structure and a second anode portion having metal foil, and the first anode portion includes a second solid electrolyte, a conductive material, and a binder, and does not include an anode active material.

2. The all-solid-state battery of claim 1, wherein the first solid electrolyte of the cathode portion is an amorphous sulfide-based solid electrolyte.

3. The all-solid-state battery of claim 1, wherein the second solid electrolyte of the anode portion is a crystalline sulfide-based solid electrolyte.

4. The all-solid-state battery of claim 1, wherein the first anode portion includes 80 to 95 wt % of the second solid electrolyte, 5 to 20 wt % of the conductive material, and 2 to 10 wt % of the binder.

5. The all-solid-state battery of claim 1, wherein a porosity of the first anode portion is between 2 and 15%.

6. The all-solid-state battery of claim 1, wherein the metal foil of the second anode portion is composed of lithium.

7. The all-solid-state battery of claim 1, wherein a thickness of the second anode portion is between 2 and 50 µm.

* * * * *